United States Patent [19]
Bell

[11] Patent Number: 6,122,278
[45] Date of Patent: Sep. 19, 2000

[54] CIRCUIT AND METHOD FOR PROTOCOL HEADER DECODING AND PACKET ROUTING

[75] Inventor: Russell Bell, Austin, Tex.

[73] Assignee: Advanced Micro Devices, Inc., Sunnyvale, Calif.

[21] Appl. No.: 08/908,415

[22] Filed: Aug. 7, 1997

[51] Int. Cl.[7] .................................................. G08C 15/08
[52] U.S. Cl. ........................ 370/392; 370/351; 370/389; 370/392; 370/393; 370/417; 340/870.13; 709/250
[58] Field of Search ..................... 370/392, 389, 370/417; 709/293, 370, 238, 250; 327/276, 281, 288, 394; 395/186; 340/870.13

[56] References Cited

U.S. PATENT DOCUMENTS

| | | |
|---|---|---|
| 5,132,572 | 7/1992 | Woo . |
| 5,220,216 | 6/1993 | Woo . |
| 5,227,679 | 7/1993 | Woo . |
| 5,264,745 | 11/1993 | Woo . |
| 5,349,612 | 9/1994 | Guo et al. . |
| 5,363,419 | 11/1994 | Ho . |
| 5,367,542 | 11/1994 | Guo . |
| 5,400,370 | 3/1995 | Guo . |
| 5,452,333 | 9/1995 | Guo et al. . |
| 5,457,336 | 10/1995 | Fang et al. . |
| 5,457,719 | 10/1995 | Guo et al. . |
| 5,495,240 | 2/1996 | Heberle .............................. 340/870.13 |
| 5,506,534 | 4/1996 | Guo et al. ................. 327/276 |
| 5,754,525 | 5/1998 | Lo et al. .................. 370/389 |
| 5,790,542 | 8/1998 | Kim et al. ................. 370/392 |

*Primary Examiner*—Dung C. Dinh
*Assistant Examiner*—Hieu C. Le

[57] ABSTRACT

A digital delay line, comprising adjustable digital delay elements coupled in series, receives and buffers a packet bit stream. The outputs of selected adjustable digital delay elements are tapped for determining in parallel the destination address bits of the packet. The packet is routed at the end of the digital delay line to the destination indicated by the destination address bits.

20 Claims, 3 Drawing Sheets

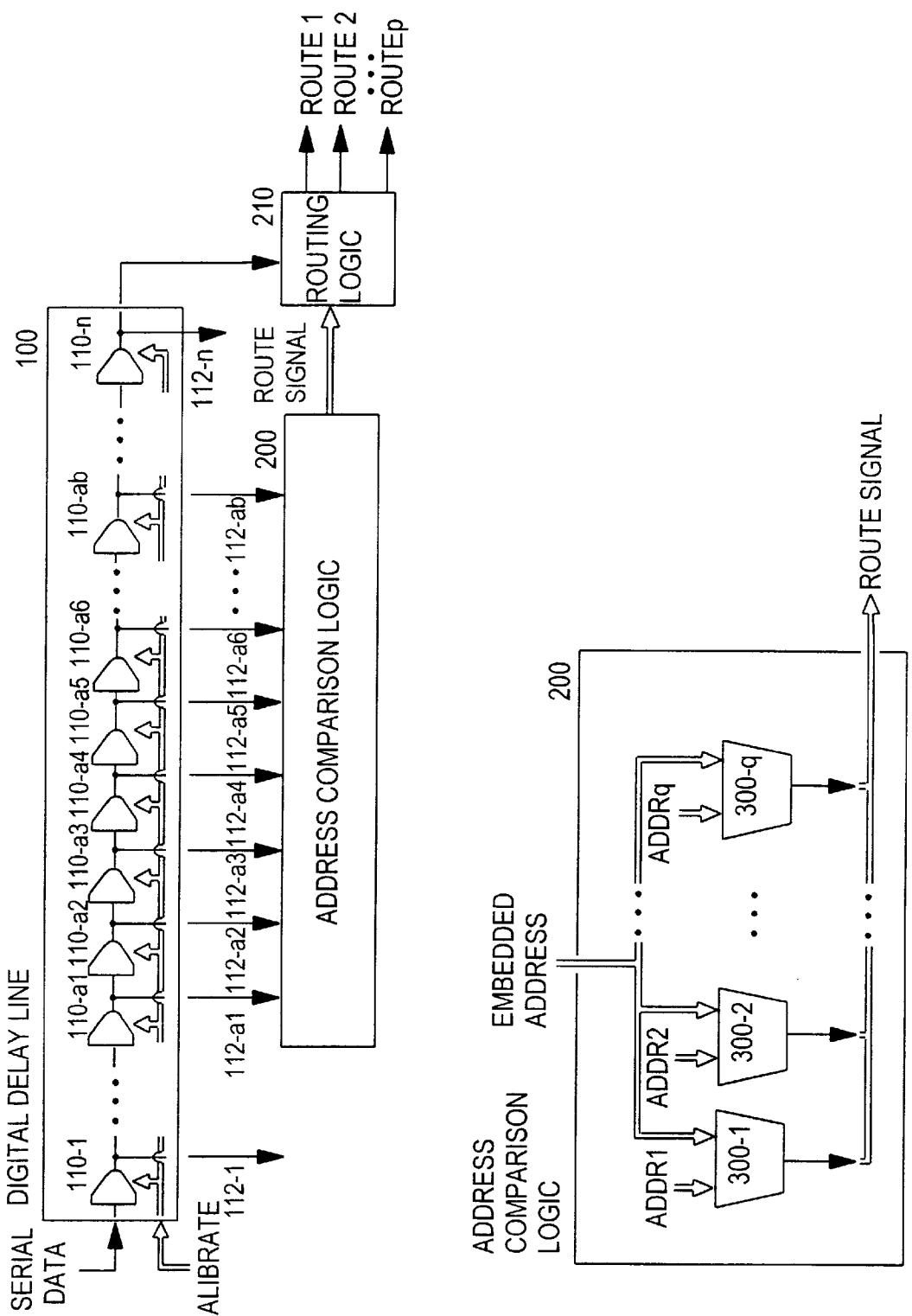

CIRCUIT AND METHOD FOR PROTOCOL HEADER DECODING AND PACKET ROUTING

TECHNICAL FIELD

The invention relates generally to computer networking and more particularly to packet protocol decoding and routing.

BACKGROUND ART

In many networks, computers exchange packets to communicate with each other. A packet is a group of bits that includes source and destination addresses as well as data bits, which form the payload of the packet. A packet may include other information such as a preamble, length (if not fixed length), padding, and error detection/correction codes.

According to the standard OSI Reference Model, there are seven layers of communications in a network. The hardware, firmware, and software for the network are responsible for the three lowest layers of the model, and the host system is responsible for the four higher layers of the model. The lowest layer is the Physical Layer which is concerned with the transmission of a raw bit stream over a physical channel, such as copper wire, optical fiber, radio, etc.

The second layer of the OSI Reference Model is the Data-Link Layer, which is responsible for establishing, maintaining, and releasing connections between and among network nodes. One common standard is the IEEE 802.3 specification, popularly known as Ethernet. A source site communicates with a destination site by transmitting a frame containing the address of the destination site to a network channel. Ethernet is a contention based networking protocol in that only one network site can transmit a frame to the channel at a time, though many sites can read the frame from the channel. However, such contention based networks suffer from performance degradation at high volumes of packet traffic.

Accordingly, some IEEE 802.3 based networks are subdivided into several segments connected by a bridge, so that traffic between nodes of one segment would not interfere with traffic between nodes of another segment. Bridges handle inter-segmental packet traffic by examining the destination addresses embedded in the packets and route those packets destined for extra-segmental nodes.

The third layer is the Network Layer, which provides an end-to-end communications link between two nodes of a network, such as the Internet. At the Network Layer, a station divides a message into one or more packets, which are transmitted individually and sent from node to node on the network until the destination node is reached. Accordingly, a router on each network site examines the contents of a packet for a destination address and makes a decision on where to send the packet next in the network.

In conventional bridges and routers, the data rate of a packet can be limited. For example, an incoming packet is usually first stored in a random access memory (RAM) buffer, such as a dynamic RAM (DRAM) buffer or static RAM (SRAM) buffer. Thus, the processing speed of a conventional bridge or router is limited by the speed of these memories.

Conventional bridges or routers typically require intervention by a processor in handling the incoming bit stream. The speed of the processor can further limit the data rate of the packet. Processors can be relatively costly and require substantial additional hardware and software resources. Part of the cost for processors also applies to functions unnecessary for routing or bridging packets. On the other hand, if a processor is already dedicated for another task, then sharing the processor to handle incoming packet reduces the performance of the shared processor.

DISCLOSURE OF THE INVENTION

There exists a need for a circuit and method that can process high-speed transmissions of packets.

There exists a need for a circuit and method that can determine the destination address of a packet and route the packet without storing the packet in a RAM buffer.

There exists a need for a circuit and method that can determine the destination address of a packet and route the packet without processor intervention.

There exists a need for a lower-cost circuit and method that can determine the destination address of a packet and route the packet.

These and other needs are met by the present invention, in which a packet bit stream is buffered in a high-speed, digital delay line. The digital delay line is tapped at various points for determining in parallel the destination address bits of the packet. The packet is routed at the end of the digital delay line to the destination indicated by the destination address bits.

According to one aspect of the present invention, a transmission circuit for directing a bit stream to one of several destinations based on an address embedded in the bit stream comprises a digital delay line for receiving and delaying the bit stream. The digital delay line includes digital delay elements having an output and configured for delaying a bit of the bit stream for a bit period. The circuit also comprises address comparison logic coupled to outputs of some of the digital delay elements for receiving address bits and producing a route signal from the address bits. The circuit further has routing logic coupled to the digital delay line and the address comparison logic for directing the delayed bit stream to one of the destinations based on the route signal. Using a digital delay line enables the bit stream to be buffered at a high-speed without RAM or processor intervention, which keeps costs down.

Another aspect of the present invention is a method of directing a bit stream to a destination based on an address embedded in the bit stream. The method includes the step of buffering bits from the bit stream in a digital delay line. Address bits being delayed in the digital delay line are tapped and compared to a plurality of predetermined addresses to produce a route signal. The method also includes the step of directing the bit stream to the destination corresponding to the route signal. Buffering the bit stream in the digital delay line allows the costs and performance penalties associated with RAM and processor intervention to be avoided.

Additional objects, advantages, and novel features of the present invention will be set forth in part in the detailed description which follows, and in part will become apparent upon examination or may be learned by practice of the present invention. The objects and advantages of the present invention may be realized and obtained by means of the instrumentalities and combinations particularly pointed out in the appended claims.

BRIEF DESCRIPTION OF DRAWINGS

The present invention is illustrated by way of example, and not by limitation, in the figures of the accompanying drawings, wherein elements having the same reference numeral designations represent like elements throughout and wherein:

FIG. 2 is a block diagram of a transmission circuit according to an embodiment of the invention.

FIG. 3 is a block diagram of address comparison logic according to an embodiment depicted in FIG. 2.

BEST MODE FOR CARRYING OUT THE INVENTION

A circuit and method for routing a bit stream are described. In the following description, for purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

HIGH-SPEED DIGITAL DELAY LINE

Figure 1A:
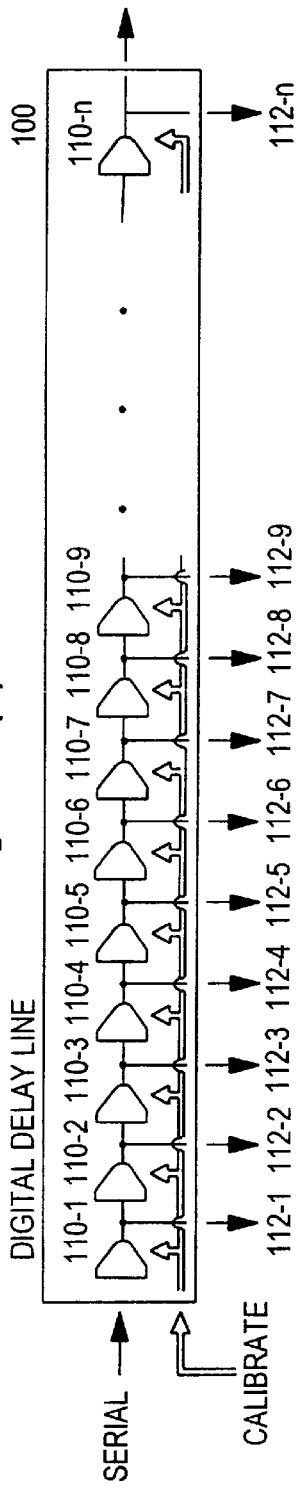
FIG. 1(a) is a block diagram of a digital delay line with which an embodiment of the invention can be implemented.

FIG. 1 is a block diagram of an exemplary high-speed, digital delay line 100 with which the present invention can be implemented. The exemplary high-speed digital delay line 100 receives a serial bit stream comprising a plurality of bits spaced at a regular interval, the "bit stream clock period." Digital delay line 100 delays the serial bit stream so that an identical serial bit stream is output but with a phase delay of an integral number of bit stream clock periods.

Specifically, digital delay line 100 comprises a plurality of digital delay elements 110-1 to 110-n, coupled in series. Each of the digital delay elements 110-1 to 110-n delays a digital signal for a specified amount of time. Digital delay line 100 may comprise an arbitrary number n of digital delay elements, limited only by the economic feasibility of the semiconductor implementation. For example, digital delay line can comprise tens of thousands of digital delay elements. The particular number of digital delay elements being used will vary from application to application. Since each of the digital delay elements 110-1 to 110-n of digital delay line 100 is constructed during the same manufacturing process on the same semiconductor substrate, it is likely that the operating characteristics, hence the delay period, of each digital delay element are nearly identical.

When the common delay period equals the bit stream clock period, each individual bit of the serial bit stream input into digital delay line 100 is being delayed by a distinct digital delay element. Thus, outputs of a plurality of digital delay elements may be tapped to simultaneously view a plurality of bits of the serial bit stream. Accordingly, digital delay line 100 comprises a plurality of taps 112-1 to 112-n coupled to the outputs of the respective digital delay elements 110-1 to 110-n for viewing portions of the serial bit stream in parallel.

The delay characteristics of any digital circuit will vary from chip to chip and over time because of unavoidable variations in manufacturing and operating conditions. Thus, there is a need to calibrate the delay period of each of the digital delay elements 110-1 to 110-n to match the bit stream clock period. According to one approach, both the delay period and the bit stream clock period are synchronized to a reliable, precise reference clock, such as a crystal oscillator.

The delay period of each of the digital delay elements 110-1 to 110-n is preferably adjustable by a digital command code as a calibration signal. This calibration signal is produced with reference to a reliable, precise clock signal, preferably by an on-chip digital servo circuit (not shown) described in the commonly assigned U.S. Pat. No. 5,457,719, issued to Guo et al. on Oct. 10, 1995, incorporated herein by reference. Briefly, the on-chip digital servo circuit comprises an adjustable digital delay line of its own, which it monitors and continually adjusts with a calibration signal in a feedback loop. The calibration signal is shared with other systems on the chip.

Figure 1C:
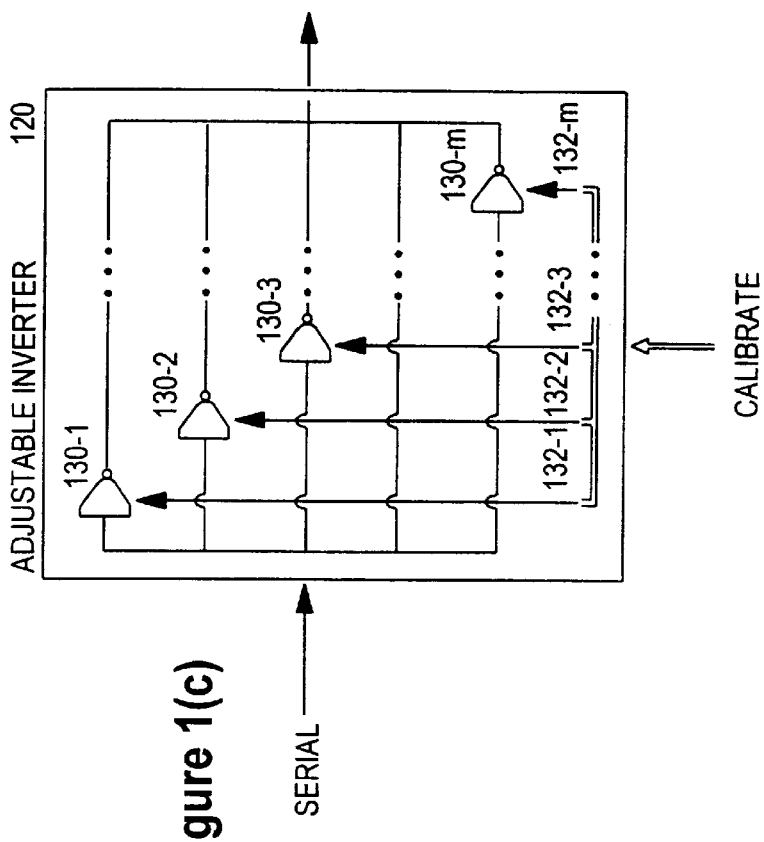
FIG. 1(c) is a block diagram of an adjustable inverter depicted in FIG. 1(c).
Figure 1B:
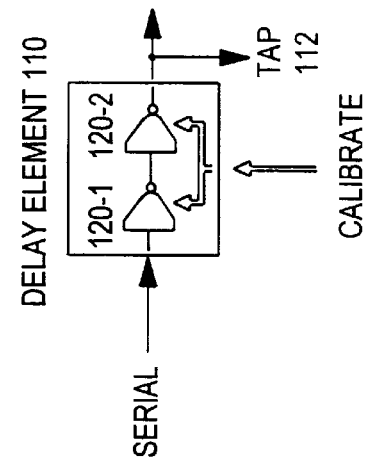
FIG. 1(b) is a block diagram of an adjustable delay element depicted in FIG. 1(a).

Referring to FIG. 1(b), each adjustable digital delay element 110 comprises two adjustable inverters 120-1 and 120-2, coupled in series, each receiving the aforementioned calibration signal. Thus, the delay period of each of the two adjustable inverters 120-1 and 120-2 is one-half of the bit stream clock period and is controlled by the calibration signal.

Referring to FIG. 1(c), each adjustable inverter 120 in a preferred embodiment comprises a plurality of switchable inverters 130-1 to 130-m coupled in parallel. Each of the switchable inverters 130-1 to 130-m is switched on or off by a bit of the calibration signal. Thus, two of the parameters that determine the propagation delay of an inverter, the P-channel size to N-channel size ratio and the driving power, may be determined for precise control over the delay period. Switchable inverters are described in further detail in the commonly assigned U.S. Pat. No. 5,220,216, issued to Woo on Jun. 15, 1993, incorporated herein by reference, and the commonly assigned U.S. Pat. No. 5,227,679, issued to Woo on Jul. 13, 1993, incorporated herein by-reference.

Accordingly, digital delay line 100 comprises a series of adjustable digital delay elements 110-1 to 110-n, each of which provides a uniform delay period synchronized to a reference clock period according to a calibration signal. Moreover, each adjustable inverter 120 can have a consistent delay period of as little as 70 ps. Thus, each adjustable digital delay element 110 can have a consistent delay period of as little of 140 ps. Therefore, digital delay line 100 is high-speed, capable of processing a serial bit stream at data rates up to about 7 GHz. Furthermore, digital delay line 100 provides parallel taps 112-1 to 112-n for simultaneously viewing in parallel any portion of a high-speed serial bit stream.

PROTOCOL HEADER DECODING AND PACKET ROUTING

FIG. 2 is a block diagram of a circuit according to an embodiment of the present invention, comprising a digital delay line 100, address comparison logic 200, and routing logic 210. Digital delay line 100 comprises n digital delay elements 110-1 to 110-n. The number of digital delay elements, n, should be large enough to hold the entire packet header, if routing Data-Link Layer frame, or the entire packet itself, if routing Network Layer packets.

Coupled to the outputs of b digital delay elements 110-a1 to 110-ab are b taps 112-a1 to 112-ab, positioned at the location of the destination address bits of the packet according to the particular packet protocol for which an embodiment of the present invention is implemented. The specific number and location of taps 112-a1 to 112-ab are described hereafter with respect to IEEE 802.3 frames and IP packets.

Address comparison logic 200 is coupled to the address bit taps 112-a1 to 112-ab for receiving the address bits. Address comparison logic 200 is configured for comparing the address bits against predetermined addresses or address patterns to produce a route signal. Routing logic 210 receives both the delayed bit stream from digital delay line 100 and the route signal from address comparison logic 200. The delayed bit stream is routed to one of p routes according to the route signal. For example, routing logic 210 may be implemented as a demultiplexor; as another example with a set of pass transistors controlled by a bit of the route signal as a switch.

Thus, an incoming packet in the form of a bit stream is buffered in digital delay line 100 and each bit of the bit stream is successively delayed by a digital delay element. At some point during the transmission of the bit stream, the bits corresponding to the destination address field of the packet is applied to address bit taps 112-a1 to 112-ab. Persons of skill in the art will readily recognize various techniques (e.g. using a counter) for determining when this point occurs in the bit stream. In fact, the particular point in the bit stream is dependent on the particular protocol of the packet being routed.

The tapped address bits are applied to the address comparison logic 200 and compared against predetermined addresses or predetermined patterns of addresses to produce a route signal, which controls routing logic 210 in directing the delay packet to one of p destinations.

According to one embodiment of the invention with reference to FIG. 3, the address comparison logic 220 comprises a plurality q of comparators, which receive the embedded address bits and compare them to a plurality of predetermined addresses ADDR1 to ADDRq. Each comparator outputs a bit indicating whether the address bits match the respective predetermined address. Thus, the route signal comprises a plurality of bits which may be input into a demultiplexor or a decoder coupled to a plurality of pass transistors in routing logic 210.

By buffering the incoming packet within a high-speed (up to 7 Ghz) delay line, the address bits of the packet header can be extracted for making routing decisions in real time, without the use of RAM memory. Furthermore, the present invention does not require processor intervention and thus avoids the costs and performance penalties associated with processor implementations of packet routing.

A BRIDGE FOR IEEE 802.3 FRAMES

According to an embodiment of the present invention, Ethernet frames can be routed through a bridge. The layout of an Ethernet frame is listed in TABLE 1.

TABLE 1

| Field | Length (bytes) | Bit Offset |
|---|---|---|
| Preamble | 7 | 0 |
| Start Frame | 1 | 56 |
| Destination Address | 2 or 6 | 64 |
| Source Address | 2 or 6 | 80/112 |
| Length | 2 | 96/160 |
| Payload | 0–1500 | 112/176 |
| Padding | 46–0 | N/A |

TABLE 1-continued

| Field | Length (bytes) | Bit Offset |
|---|---|---|
| CRC code | 4 | 12112/12176 |
| TOTAL | 1518/1526 | 12144/12208 |

Thus, in this embodiment, the destination bits are found starting at the 65th position from the beginning of the packet. The number of address bits is either 16 bits or 48 bits, depending on the length of the destination address field. The source and destination address fields have the same number of bits. The padding field is used to augment the payload field for a minimum of 46 bytes of information. The maximum size of the payload is 1500 bytes, in which case the padding field is zero bytes.

The minimum number of bits of a frame header that must be received to inspect the destination address field depended on the number of bytes for the destination address field. If 6-byte addresses are used, then the digital delay line 100 comprises 112 digital delay elements 110 and 48 address taps 112-a. On the other hand, if 2-byte addresses are used, then the digital delay line 110 need only comprise 90 digital delay elements 110 and 16 address taps 112-a.

A ROUTER FOR IP PACKETS

According to another embodiment, the destination address embedded in an IP (Internet Protocol) packet is extracted for routing. For example, referring to FIG. 4, Ethernet frame at the Data-Link Layer 400 comprises a data payload 402. The data payload 402 includes a Network Layer IP packet 410, in which the destination address field 412 of the IP packet 410 is 32 bits wide and is found at bit offset 128. Thus, the address comparison logic 200 receives 32 bits from 32 address taps 122-a.

Figure 4:
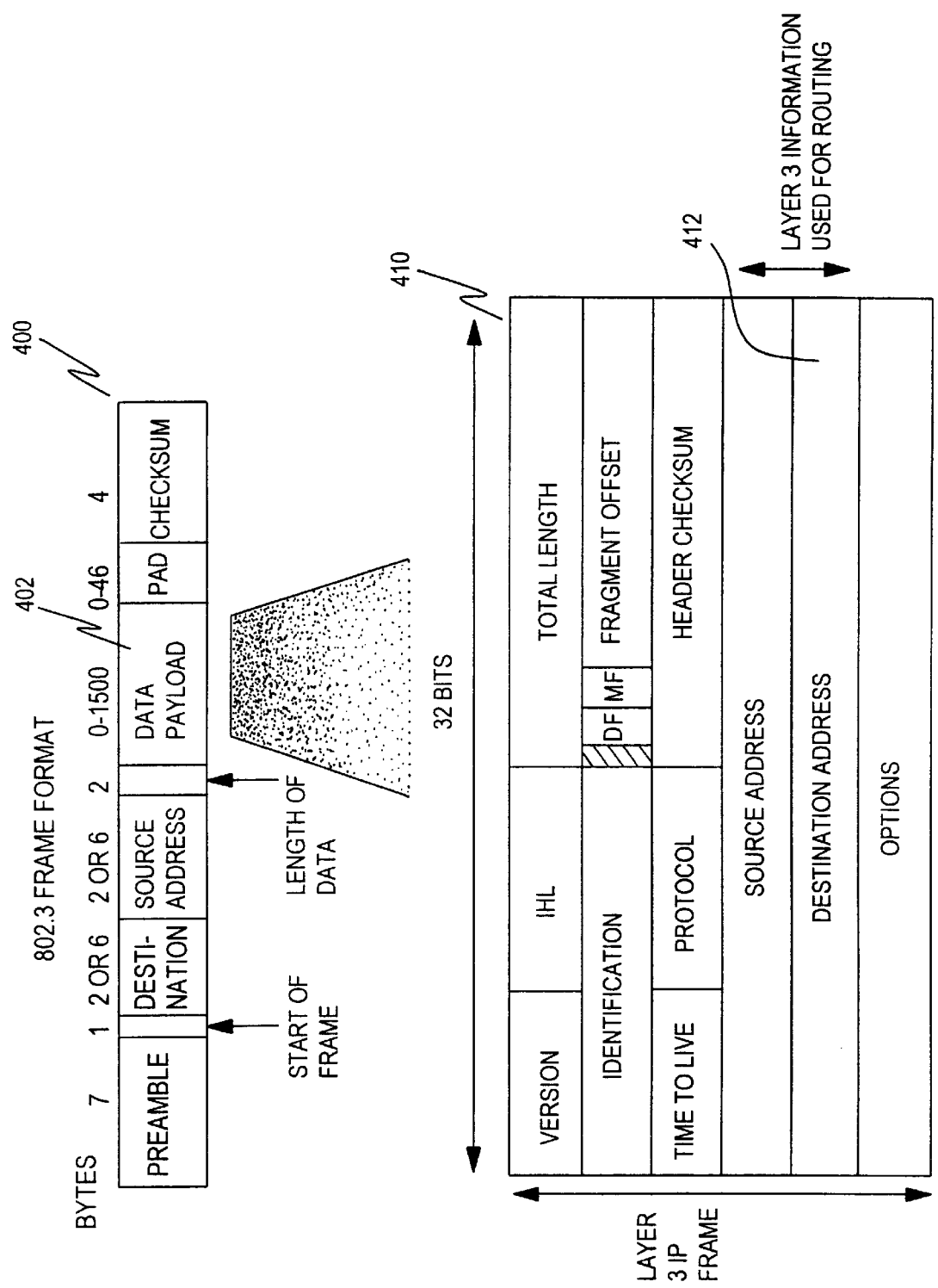
FIG. 4 is a diagram of an IP packet embedded in an 803.2 frame.

If an IP packet is carried over Ethernet, as depicted in FIG. 4, it is preferably large enough to hold the entire frame. If 6-byte address are used, the maximum size of the Ethernet frame is 12,208 bits. In this case, a digital delay line 100 sufficient to hold an Ethernet frame of this size comprises 12,208 digital delay elements 110, and the payload includes the 177th bit through 12,176th bit of the frame. Accordingly, to obtain the IP destination address within an Ethernet frame, an implementation comprises 32 address taps 112-a starting at the 305th bit of the frame.

On the other hand, if 2-byte address are used, the maximum frame size is 12,144 bits. In this case, a digital delay line 100 need comprise only 12,144 delay elements 110, and the payload includes the 113th bit through 12,112th bit of the frame. Accordingly, to obtain the IP destination address within an Ethernet frame, an implementation comprises and 32 address taps 112-a, starting at the 241th bit of the frame.

While the present invention has been described in connection with what is presently considered to be the most practical and preferred embodiments, it is to be EL understood that the present invention is not limited to the disclosed embodiments, but, on the contrary, is intended to cover various modifications and equivalent arrangements included within the spirit and scope of the appended claims.

What is claimed is:

1. A transmission circuit for directing a packet to one of a plurality of destinations based on an address embedded in the packet, said transmission circuit comprising:

a digital delay line, including a plurality of digital delay elements coupled in series, for receiving the packet as a bit stream and delaying said bit stream, each digital delay element having an output and configured for delaying a bit of said bit stream for a bit period;

address comparison logic coupled to the outputs of some of the digital delay elements for receiving respective address bits of the packet and producing therefrom a route signal; and routing logic coupled to said digital delay line and said address comparison logic for directing said delayed bit stream from said digital delay line to one of said plurality of destinations based on said route signal.

2. The transmission circuit of claim 1, wherein:

said digital delay line further includes a calibration input for receiving a calibration signal; and each of said plurality of digital delay elements includes a calibration input for receiving said calibration signal for adjusting the delay period thereof.

3. The transmission circuit of claim 1, wherein the delay period of each of said plurality of digital delay elements is the same.

4. The transmission circuit of claim 1, wherein the delay period of each of said plurality of digital delay elements is at least 140 ps.

5. The transmission circuit of claim 1, wherein said address comparison logic is coupled to sixteen of the digital delay elements.

6. The transmission circuit of claim 1, wherein said address comparison logic is coupled to thirty-two of the digital delay elements.

7. The transmission circuit of claim 1, wherein said address comparison logic is coupled to forty-eight of the digital delay elements.

8. The transmission circuit of claim 1, wherein said digital delay line includes between 90 and 112 digital delay elements, inclusive.

9. The transmission circuit of claim 1, wherein said digital delay line includes between 12,144 and 12,208 digital delay elements, inclusive.

10. The transmission circuit of claim 9, wherein said address comparison logic is coupled to the outputs of a plurality of the 113th through 12,112th digital delay elements from the beginning of the packet.

11. The transmission circuit of claim 10, wherein said address comparison logic is coupled to the outputs of the 241th through 262nd digital delay elements from the beginning of the packet.

12. The transmission circuit of claim 9, wherein said address comparison logic is coupled to the outputs of a plurality of the 177th through 12,176th digital delay elements from the beginning of the packet.

13. The transmission circuit of claim 12, wherein said address comparison logic is coupled to the outputs of the 305th through 336th digital delay element from the beginning of the packet.

14. The transmission circuit of claim 1, wherein said address comparison logic is further configured for comparing said plurality of address bits to a plurality of predetermined addresses for producing therefrom said route signal.

15. The transmission circuit of claim 14, wherein said address comparison logic includes a plurality of address comparators for comparing said plurality of bits to one of said plurality of predetermined addresses for producing therefrom a bit of said route signal.

16. The transmission circuit of claim 1, wherein each of digital delay elements includes a plurality of inverters coupled in series.

17. A method of directing a packet to one of a plurality of destinations based on an address embedded in said packet, said method comprising the steps of:

receiving the packet as a bit stream;

buffering a plurality of bits from said bit stream in a digital delay line;

tapping a plurality of address bits embedded in the packet from among said plurality of bits being delayed in said digital delay line;

comparing said plurality of address bits to a plurality of predetermined addresses to produce a route signal; and directing the buffered packet from the digital delay line to a corresponding destination of said plurality of destinations based on said route signal.

18. The method of claim 17, wherein the step of tapping a plurality of address bits includes the step of tapping said plurality of address bits that corresponds to a destination address field of an IEEE 802.3 frame.

19. The method of claim 17, wherein the step of tapping a plurality of address bits includes the steps of:

determining a payload portion of said bit stream; and tapping said plurality of address bits from the payload portion that corresponds to a destination address field of an IP packet.

20. The method of claim 16, wherein the digital delay line comprises a plurality of digital delay elements, each of said digital delay elements including a plurality of inverters coupled in series.

* * * * *